W. R. ECKART.
Air-Compressor.
No. 224,081. Patented Feb. 3, 1880.
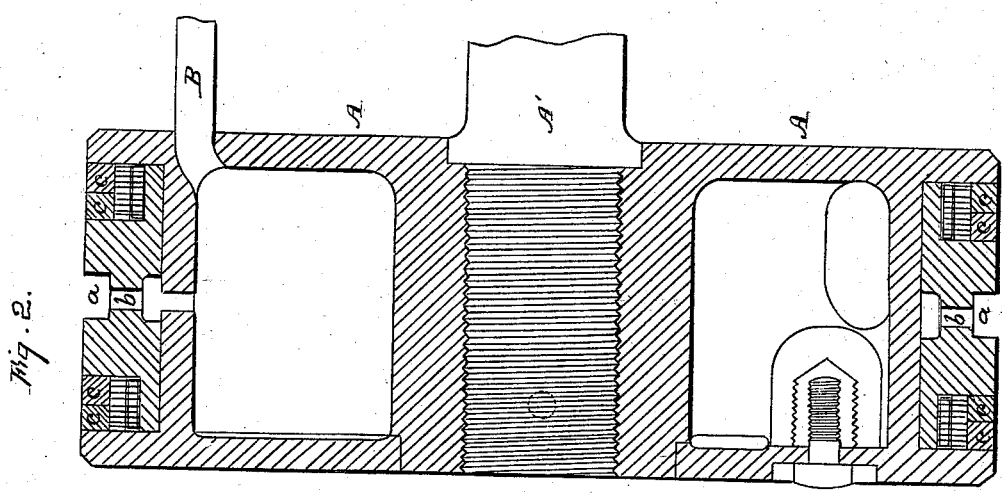
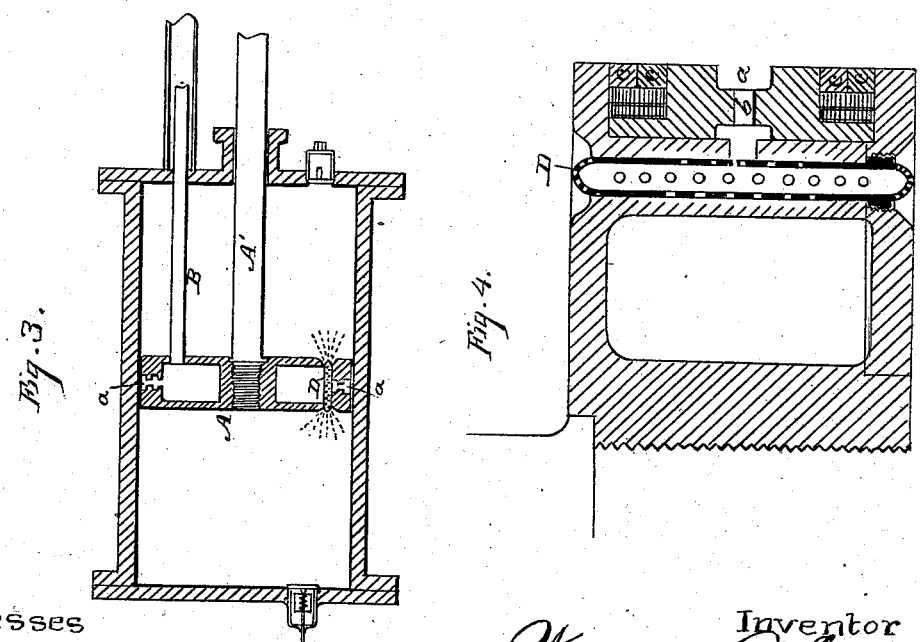
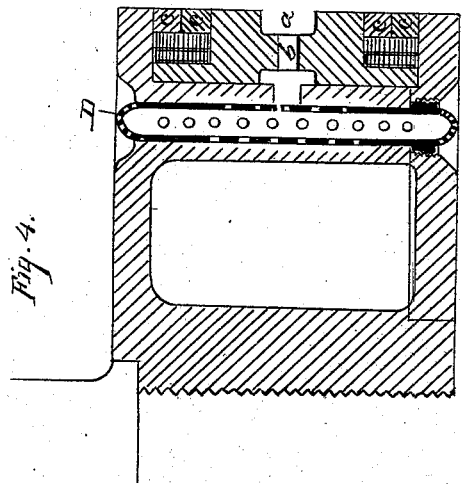
Witnesses
Frank A. Brooks
J. H. Krouse
Inventor
William R. Eckart
By Dewey & Co.
Attys

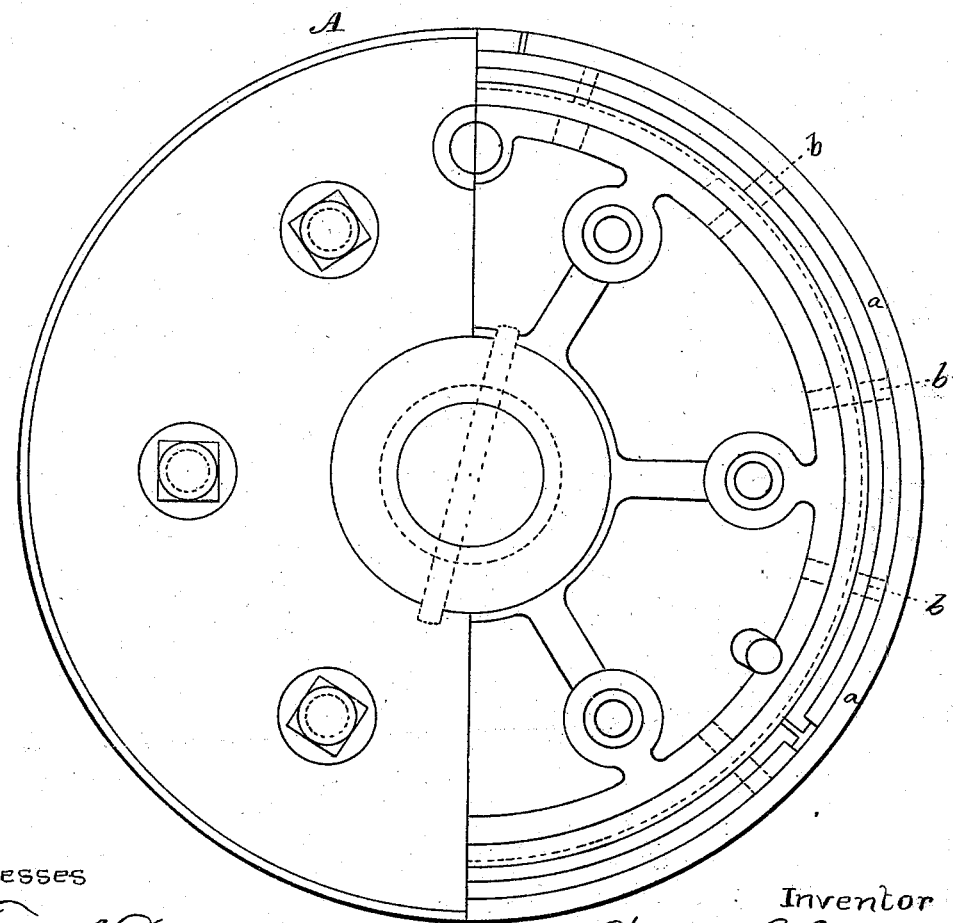

United States Patent Office.

WILLIAM R. ECKART, OF VIRGINIA CITY, NEVADA.

AIR-COMPRESSOR.

SPECIFICATION forming part of Letters Patent No. 224,081, dated February 3, 1880.

Application filed December 1, 1879.

*To all whom it may concern:*

Be it known that I, WILLIAM R. ECKART, of Virginia City, county of Storey, State of Nevada, have invented an Improved Air-Compressor; and I hereby declare the following to be a full, clear, and exact description thereof.

My invention relates to certain improvements in air-compressors; and my improvements consist in a peculiar means of introducing sprays of water to the interior of the cylinder of an air-compressing engine, by which the air is cooled.

Referring to the accompanying drawings for a more complete description of my invention, Figure 1 shows one side of my piston with a portion removed. Fig. 2 is a section of the same through the center. Fig. 3 shows the piston within the cylinder. Fig. 4 is an enlarged portion of the piston.

Let A represent the piston of an air-compressing cylinder, having the usual piston-rod A'. A pipe or tube, B, communicates with the interior of this piston and extends through the head of the cylinder, where it fits into a water pipe or sleeve having a suitable stuffing-box, so that water may enter said tube at all times during the reciprocating action of the piston.

The water passing through the tube enters the hollow piston, around the center of which is a slot or groove, *a*, provided with outlets or orifices *b*. On each side of this groove are the usual packing-rings *c*, as shown, and the water issuing from the piston through the orifices *b* against the sides of the cylinder is confined between the rings to a certain extent, but acts in cooling the cylinder in a manner similar to that described in former patents.

Extending through the ends or heads of the piston is the perforated pipe D, both ends of the pipe being perforated, and the center also, as shown. The water which is delivered to the interior of the piston by means of the pipe or tube B, as described, enters the central perforations of the jet-pipe D, and issues from the perforations at both ends. While, therefore, the reciprocation of the piston draws in and compresses the air, jets or sprays of water are mingled with said air on both sides of the piston by means of said tube or pipe D. This tube or pipe is preferably placed at the top of the piston, so that the spray may fall through the whole body of air contained in the cylinder, and it is placed in line with one of the valve-openings, so that it may be removed through said opening, if desired, without removing the cylinder-head.

Its action is as follows: As the piston approaches one end of the cylinder and gradually compresses the air contained in that part of the cylinder the spray of water is discharged from the nozzle in the piston, so as to fall through the body of air as it gradually increases in density, and this water absorbs the latent heat given out by the air as it is compressed, so that the latter may be delivered from the cylinder at a reduced temperature. The action of the continuous spray, which is advanced as it discharges into the body of air increasing in density, is more effective in cooling it than when discharged from a stationary jet through the sides of the cylinder. While this action is taking place in the condensing or compressing end of the cylinder the jet at the opposite side of the piston is discharging a constant spray into the charge of air which is being received through the valves into that end of the cylinder. As this air is received at the ordinary temperature it will be reduced by the spray of water, and, as a consequence, will be so reduced in bulk that more can be taken into the cylinder at each stroke of the piston, thereby giving the compressor greater capacity. This arrangement also enables me to load the air with moisture, and experience has proved that when thus loaded its elasticity and expansions are considerably increased; also, that less power is required to compress saturated or moist air than when dry, and that the expansive effect to be derived from the air when compressed is greater from moist air than from dry.

I am aware that water has been introduced to the piston of an air-compressor, and that it has been allowed to flow outwardly into a groove upon its periphery, so as to move in contact with the interior of the cylinder. I am also aware that stationary jet tubes or openings have been employed to introduce water to the cylinders of air-compressors. I do not therefore claim, broadly, either of these devices; but What I do claim as new, and desire to secure by Letters Patent, is—

1. The hollow piston A, with its solid actuating piston-rod A', in combination with the tube or pipe B, connected to and moving with the piston-rod and extending through the cylinder-head to the water-supply, and the spray or discharge openings in the piston, substantially as and for the purpose herein described.

2. The hollow piston A, reciprocating within its cylinder, and receiving water to its interior by the pipe B, as shown, in combination with the perforated tube D, having its ends adapted to discharge a spray of water into the body of air while the piston approaches and compresses it, substantially as herein described.

3. The hollow piston A, with its water-supply pipe B, and the perforated tube D, having its ends formed to throw a spray of water into the cylinder upon each side of the piston simultaneously, whereby the air under compression and that which is being received into the cylinder will be cooled at the same time, substantially as herein described.

4. The improvement in cooling and saturating air under compression consisting in continuously discharging an advancing spray of water into a body of air which is increasing in density by the action of the compressor-piston, substantially as and for the purpose herein described.

5. The jet or spray pipe D, secured so as to project through the piston of an air-compressor, and adapted to be removed through an opening in the cylinder-head without removing said head, substantially as herein described.

In witness whereof I have hereunto set my hand.

WILLIAM R. ECKART.

Witnesses:
S. H. NOURSE,
FRANK A. BROOKS.